United States Patent

Sharrah

(10) Patent No.: US 6,652,115 B2
(45) Date of Patent: Nov. 25, 2003

(54) BATTERY CHARGER STRUCTURE AND RECHARGEABLE FLASHLIGHT SYSTEM USING THE SAME

(75) Inventor: Raymond L. Sharrah, Collegeville, PA (US)

(73) Assignee: Streamlight, Inc., Norristown, PA (US)

(*) Notice: Subject to any disclaimer, the term of this patent is extended or adjusted under 35 U.S.C. 154(b) by 0 days.

(21) Appl. No.: 10/014,826

(22) Filed: Oct. 26, 2001

(65) Prior Publication Data

US 2003/0081412 A1 May 1, 2003

(51) Int. Cl.⁷ ................................. F21L 13/00
(52) U.S. Cl. .................. 362/183; 362/157; 320/113
(58) Field of Search ............... 362/183, 157; 320/113, 107, 112, 114, 115

(56) References Cited

U.S. PATENT DOCUMENTS

| | | | | | |
|---|---|---|---|---|---|
| 2,410,527 A | * | 11/1946 | Schinske | ................... | 320/103 |
| 2,418,141 A | * | 4/1947 | Salazar | ........................ | 320/110 |
| 2,478,887 A | * | 8/1949 | Nelson | ............................ | 429/1 |
| 4,092,580 A | * | 5/1978 | Prinsze | ........................ | 320/115 |
| 4,629,962 A | * | 12/1986 | Arakawa | ..................... | 320/113 |
| 5,165,048 A | * | 11/1992 | Keller et al. | ................ | 320/113 |
| 5,394,073 A | * | 2/1995 | Nagai | ......................... | 320/115 |
| 5,432,689 A | * | 7/1995 | Sharrah et al. | ............ | 362/183 |
| 5,656,914 A | * | 8/1997 | Nagele et al. | .............. | 320/113 |
| 5,772,309 A | * | 6/1998 | Groben | ....................... | 362/183 |
| 6,049,192 A | * | 4/2000 | Kfoury et al. | ............. | 320/113 |
| 6,127,802 A | * | 10/2000 | Lloyd et al. | ............... | 320/113 |
| RE37,092 E | * | 3/2001 | Sharrah et al. | ............ | 362/183 |
| 6,350,040 B1 | * | 2/2002 | Parker | ........................ | 320/113 |

* cited by examiner

Primary Examiner—Alan Cariaso
Assistant Examiner—Ismael Negron
(74) Attorney, Agent, or Firm—Dann, Dorfman, Herrell & Skillman, P.C.

(57) ABSTRACT

A flashlight battery charger has upper and lower receptacles for holding respective ends of a battery assembly therein securing against lateral forces. The battery charger structure is configured to be combined with a flashlight charger assembly and to form a common back plate therewith for securing mounting the combined assembly.

17 Claims, 4 Drawing Sheets

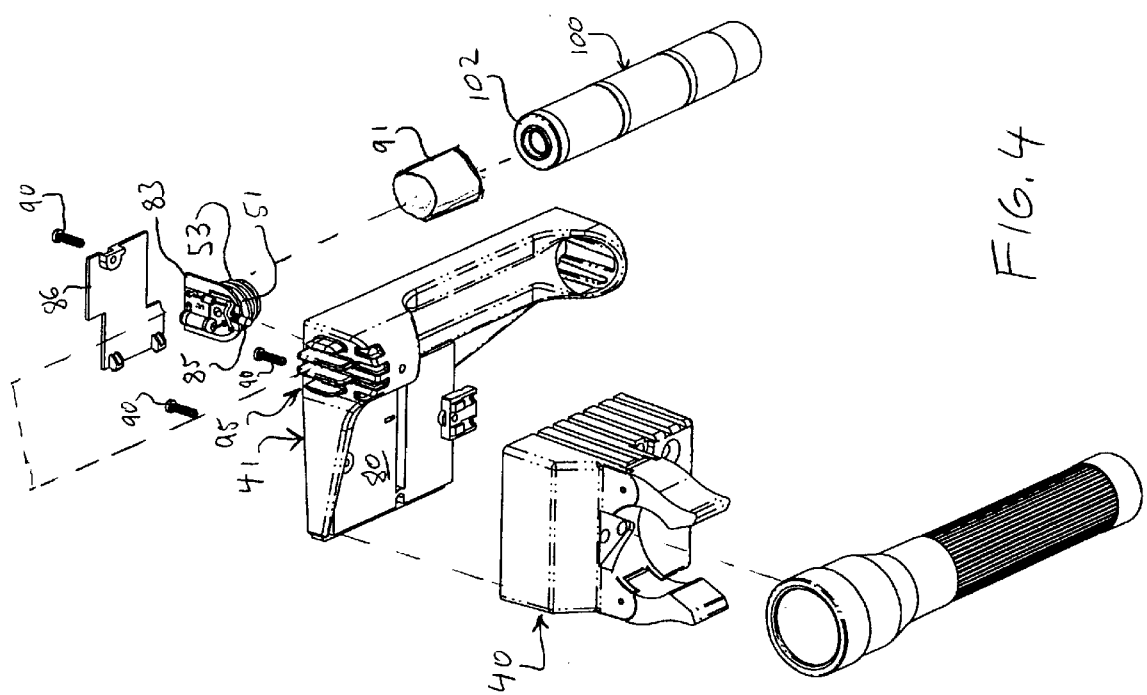

BATTERY CHARGER STRUCTURE AND RECHARGEABLE FLASHLIGHT SYSTEM USING THE SAME

BACKGROUND

Rechargeable flashlight systems are essential accessories for emergency personnel and others needing a portable and readily-available source of illumination. One such flashlight system is that described in U.S. Pat. No. RE 37,092, the entire disclosure of which is incorporated by reference herein. Such flashlights are manufactured by Streamlight Inc. of Norristown, Pa., and sold under the "STINGER" brand family of rechargeable flashlight systems. Briefly, the '092 patent describes a flashlight, battery assembly, and charging system in which the battery assembly is charged when the flashlight is stored in the charger unit. The charging unit securely holds the flashlight during charging, so that the charger unit may be mounted in a vehicle.

Due to the essential utility and effectiveness of these flashlights, the battery assembly therein may become discharged upon extended or repeated use, if sufficient recharging time is not provided. It would therefore be desirable to provide, as a further accessory to such a flashlight system, an auxiliary battery charger in which an auxiliary battery may be simultaneously charged and maintained in a charged condition, so that an exhausted battery may be rapidly replaced in the field. It would further be desirable to provide such an auxiliary battery charger as an integrated unit with the main flashlight charging unit.

SUMMARY OF THE INVENTION

According to one aspect of the present invention, there is provided an auxiliary battery charger for a rechargeable flashlight system in which an auxiliary battery assembly is simultaneously charged and maintained in a charged condition for replacement of an exhausted battery assembly of a rechargeable flashlight. The auxiliary battery charger is configured to have an upper and lower receptacle for securely holding respective ends of a cylindrical battery assembly, in order to maintain the battery within the auxiliary charger during shocks and strong vibrations such as may be encountered in vehicular use.

According to another aspect of the present invention, an auxiliary battery charger is integrated with a charging unit of a rechargeable flashlight system, in order to charge and maintain an auxiliary battery assembly in a charged condition, while providing storage of the auxiliary battery assembly at the same location, and as a single unit with, the flashlight charging unit.

Other inventive aspects and advantages of the present invention shall be made apparent in the following detailed description.

BRIEF DESCRIPTION OF THE FIGURES

The foregoing summary, and the following detailed description will be best understood in connection with the attached drawings, in which:

FIG. 4 is an exploded view of the system of FIG. 1.

DETAILED DESCRIPTION

Figure 1:
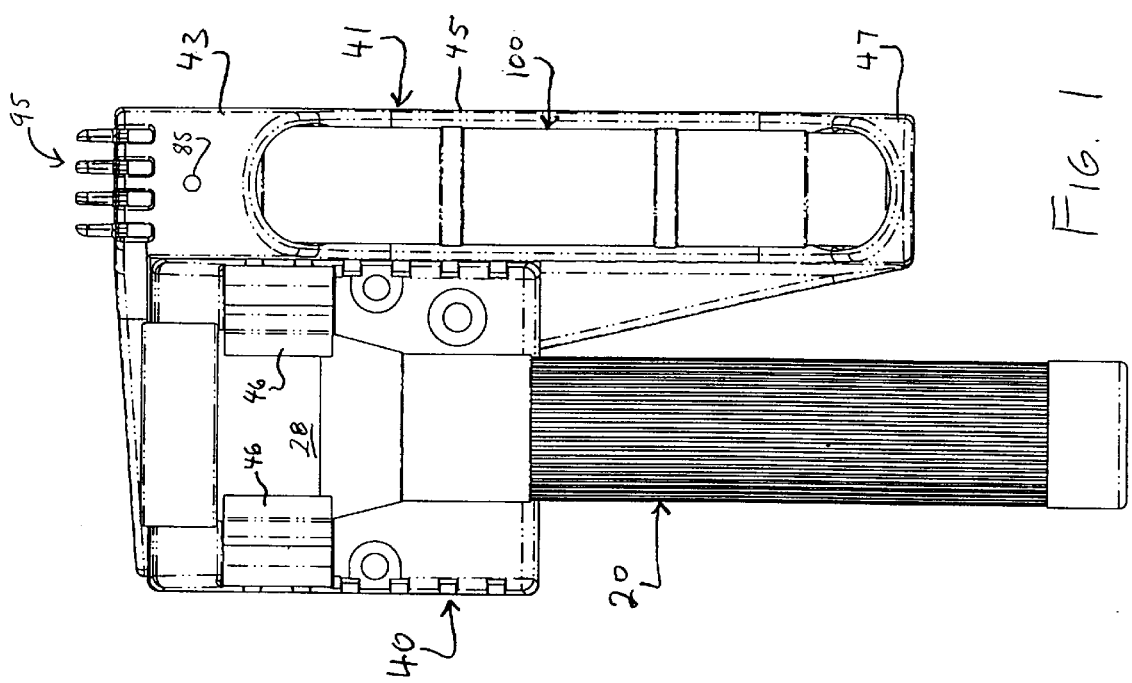
FIG. 1 is a front elevational view of a rechargeable flashlight system of the present invention.

Referring now to FIG. 1, there is shown an elevational view of an integrated flashlight charging unit 40 and auxiliary battery charger 41, and in which a rechargeable flashlight 20 and an auxiliary battery assembly 100 are shown installed in respective charging positions. The charging unit 40 includes a pair of jaws 46, which snugly grip the head 28 of the flashlight 20. The gripping action of the jaws 46 is adapted to securely hold the flashlight 20 and to allow the charging unit 40 be mounted in any desired orientation without the flashlight separating from the charging unit. The gripping action of the jaws 46 further allows the charging unit 40 to be mounted upon surfaces subject to vibration such as occurs within an automobile or other vehicle.

The auxiliary battery charger 41 includes an upper contact portion 43, a longitudinal rib portion 45, and a lower stop portion 47. The longitudinal rib portion 45 extends along the longitudinal axis of the auxiliary battery charger 41 in parallel with the longitudinal axis of the battery assembly 100, and joins with the upper contact portion 43 and the lower stop portion 47 at respective ends thereof.

Figure 2:
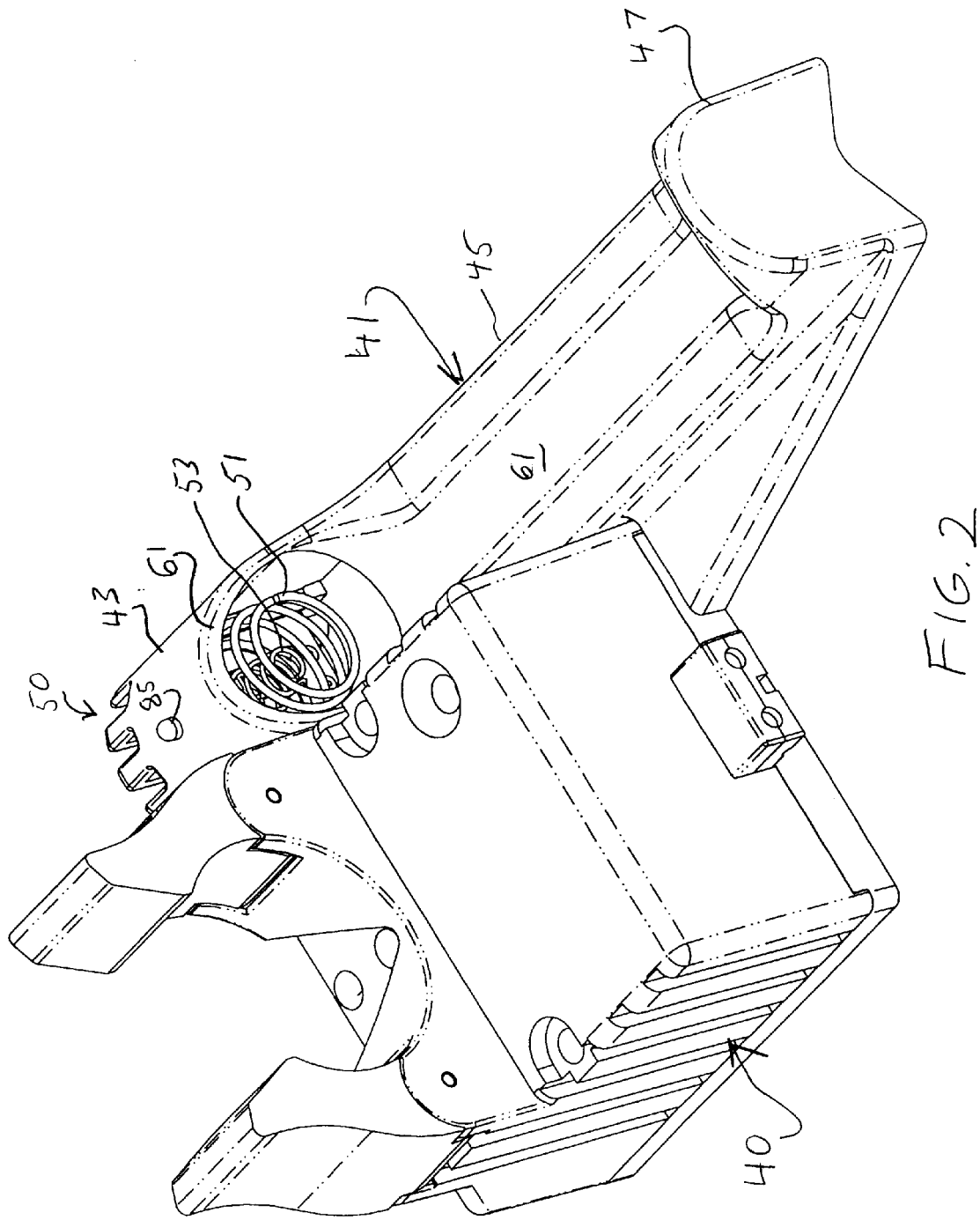
FIG. 2 is a perspective view of the main and auxiliary charging units of the system of FIG. 1.

In FIG. 2, the flashlight charging unit 40 and the auxiliary battery charger 41 are shown with the flashlight 20 and the auxiliary battery 100 removed. Within the upper contact portion 43 of the auxiliary battery charger 41, there is provided a compressive member, such as a spring 51. The spring 51 exerts a compressive force against the upper end of the battery in the charging configuration, thus urging the lower end of the battery against the lower stop portion 47. In a preferred embodiment, the auxiliary battery assembly is of the type described in U.S. Pat. No. RE 37,092, which has both positive and negative contacts located at one end (herein designated the "upper" end for purpose of reference). The spring 51 also provides one of the electrical charging contacts to the battery. The other electrical charging contact to the battery is provided by spring 53, which is also housed in the upper contact portion 43 in a concentric relationship with spring 51.

In alternative embodiments, the functions of providing charging contacts and longitudinal compressive engagement of the battery within the auxiliary battery charger may be provided by separate structures located at either or both of the upper and lower ends portions of the auxiliary charger. For example, substantially stationary contacts may be provided at one end portion of the auxiliary battery charger, while a spring located at the lower stop portion may provide a compressive force to urge a contact end of the battery into engagement with such stationary contacts. Alternatively, an auxiliary battery charger for batteries of the type having positive and negative contacts at respective opposite ends thereof, may be provided with a spring contact at one end and a stationary contact at the other end. In yet another alternative embodiment, respective positive and negative charging contacts may be positioned upon a single spring-loaded member positioned in one end portion of the charger 41. The preferred configuration shown in FIG. 2 is particularly advantageous in that longitudinal vibration of the charging unit 41 will not tend to disengage either of the battery contacts from the spring charging contacts. Because battery charging circuitry typically follows a predetermined sequence of charging current, the relative immunity from disengagement provided in the preferred configuration avoids potential resetting of the charging circuitry upon inadvertent contact disengagement from vibration, as may occur in less preferred configurations.

In order to prevent the upper end of the battery from lateral dislodgement from the charging configuration, such as due to vehicular vibration, the upper contact portion 43 has a rim portion 61 formed at a lower end thereof. In the preferred embodiment, the rim portion 61 encircles the lower end of the upper contact portion 43 from one side of the upper end of the rib portion 45 to the other, so that the upper contact portion forms a receptacle for receiving the upper end of the battery therein. Thus, the battery is held in place by compression and displacement of the compression member in the receptacle. Vents 50 are found in the receptacle, in order to vent gas from the battery during charging. In alternative embodiments, one or more rim segments may be provided in order to extend along an upper longitudinal portion of the battery, to resist dislodgement of the battery as would otherwise occur due to lateral vibrational force. The continuous rim portion 61, as joined to the rib portion 45, of the preferred embodiment shown provides a continuous side wall about the entire upper end of the battery, to resist forces along any lateral axis.

Figure 3:
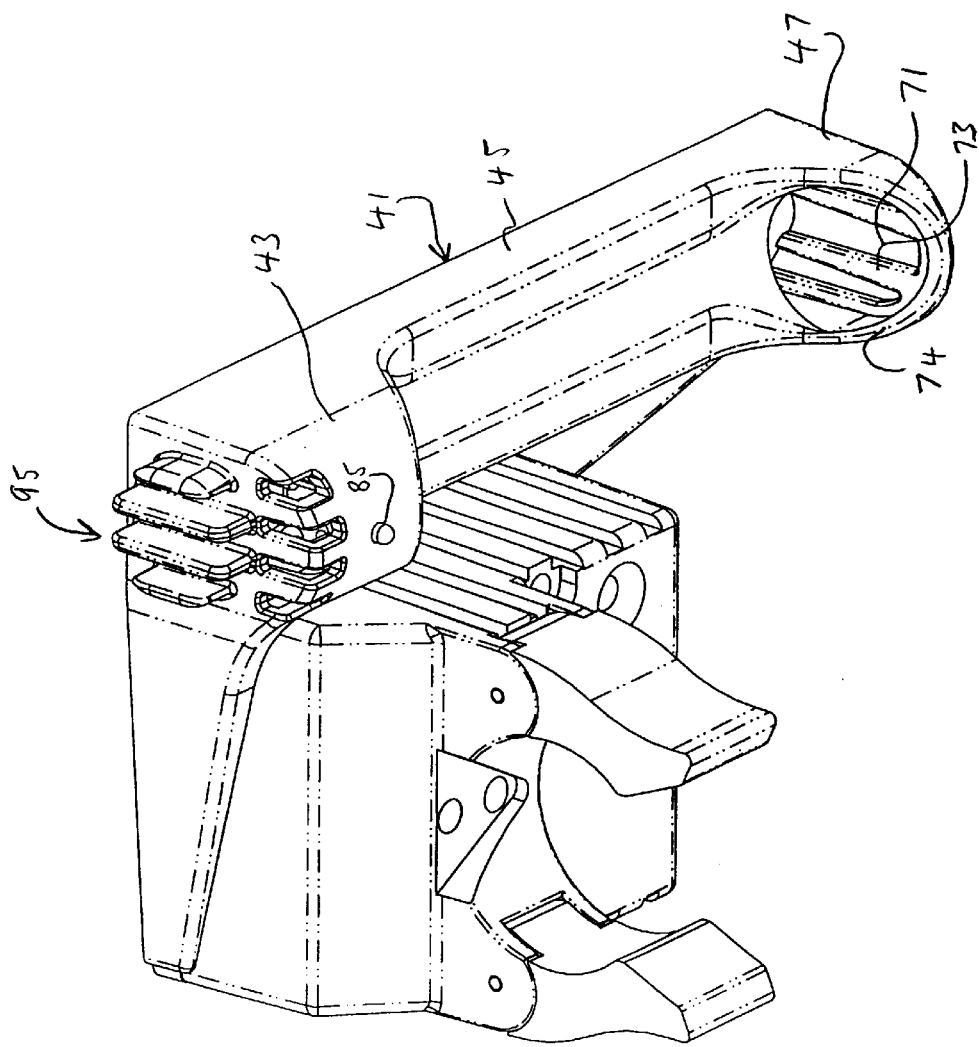
FIG. 3 is another perspective view of the main and auxiliary charging units of the system of FIG. 1.

The lower stop portion 47 is more clearly seen in FIG. 3. The lower stop portion provides a counteracting mechanical stop to the compressive force applied by the spring or springs in the upper contact portion 43, to hold the battery stationary within the charger 41 along its longitudinal axis in the charging configuration. In the preferred embodiment, the lower stop portion 47 comprises a wall 71 projecting orthogonally from the lower end of the longitudinal rib portion. Along the wall 71 there are formed upward projections or ribs 73 which separate the lower end of the battery from the wall 71, and provide gaps therebetween for venting of gas from the lower end of the battery assembly. The lower stop portion 47 preferably comprises a rim portion 74 about the upper end thereof thus forming a receptacle for receiving the lower end of the battery into the lower stop portion. The rim portion 74 counteracts lateral forces, such as vibrational forces, which would otherwise tend to surge the lower end of the battery assembly out of engagement with the lower stop portion 47. In the preferred embodiment, the rim portion 74 is formed to continuously encircle the lower end of the battery from one side of the longitudinal rib portion 45 to the other side thereof. In alternative embodiments, such a means to counteract lateral force may be segmented or discontinuous.

It will be appreciated that formation of respective upper and lower receptacle portions at opposing ends of the longitudinal rib 45 results in a longitudinal open space along the longitudinal rib portion which is shorter than the overall length of the battery assembly. In order to insert the battery into the auxiliary charger 41, the battery is first held at an acute angle to the longitudinal rib portion 45, such that the upper end of the battery may be inserted into the upper receptacle to compress the springs 51, 53 therein. Then, when the springs are sufficiently compressed such that the lower end of the battery may clear the lower rim portion 74, the battery is pivoted to a parallel orientation relative to the longitudinal rib portion 45 locking the battery in place. The battery may then be released, so that the springs will drive the lower end of the battery into abutment with the lower stop portion 47. The longitudinal rib portion 41 preferably has a groove 62 formed along at least a portion thereof to accommodate alignment of the battery with the upper receptacle upon insertion of the upper end of the battery therein.

After charging, the battery may be removed from the auxiliary charger 41 by following the reverse order of insertion. First, the battery is moved upward against the springs 51, 53 in a direction parallel with the longitudinal rib 45. When the battery has been moved sufficiently upward for the lower end of the battery to clear the lower rim portion 74, the lower end of the battery is pivoted out of alignment with the lower stop portion 47. Finally, by relaxing the upward pressure upon the battery 51, 53, the springs in the upper contact portion 43 will drive the upper end of the battery out of the upper contact portion 43, and the battery may be pulled away from the auxiliary charger 41 for placement into the flashlight.

Further construction details of the rechargeable flashlight system and auxiliary battery charger 41 are made apparent in the exploded view of FIG. 4. The body of the auxiliary charger 41 is integrally formed with a laterally extending back plate portion 80, which mates to the rear of the housing of charging unit 40 to provide the rear wall thereof. The springs 53 and 51 are mounted to a circuit board 83, upon which may be mounted other electrical components such as a charge indicator LED 85 which extends through the forward wall of the upper contact portion 43 in the assembled condition. The circuit board 83 is held in the upper contact portion by respective slots (not shown) formed in interior surfaces thereof for holding the edges of the circuit board in a fixed position therein. A back plate 86 is positioned to form the rear wall of the upper contact portion, and the back plate 86, the back plate portion 80 of the auxiliary charger body, and the charging unit 40 are held together by screws 90.

Because the battery 100 has respective positive and negative contacts exposed in close proximity at the upper end 102 thereof, it is desirable to provide an insulating cap 91 to cover the upper end 102 of the battery 100 when it is transported or stored separately from the charging system. Inadvertent conduction between the battery contacts would otherwise pose a risk of fire or explosion. In order to store the insulating cap 91 when the battery 100 is positioned in the auxiliary charger, a cap holding structure, such as a circular arrangement of raised fins 95, is provided on the auxiliary charger upon which the cap 91 is placed for storage.

The terms and expressions which have been employed are used as terms of description and not of limitation and there is no intention in the use of such terms and expressions of excluding any equivalents of the features shown and described, or portions thereof, but it is recognized that various modifications are possible within the scope of the invention claimed.

That which is claimed is:

1. A battery charger, comprising:
    a body, having an upper contact portion having an upper rim portion for holding the upper end of the battery therein contrary to a lateral force, a longitudinal rib portion, and a lower stop portion having a lower rim portion for holding the lower end of the battery therein contrary to a lateral force;
    the upper contact portion having a compressive contact therein for making electrical contact with a charging contact of a rechargeable battery and for exerting a compressive force upon an upper end of the battery;
    the lower stop portion providing a mechanical stop at a lower end of the battery; and
    the longitudinal rib portion joining the upper contact portion and the lower stop portion, whereby the rechargeable battery is compressively held between the upper contact portion and the lower stop portion.

2. The battery charger of claim 1 comprising a cap holder for holding a removable insulating cap for the battery.

3. The battery charger of claim 1 integrated with a flashlight charging unit for holding and charging a rechargeable flashlight.

4. The battery charger of claim 1 wherein the respective upper and lower rim portions at least partially surround the respective upper and lower ends of the battery forming respective upper and lower receptacles for receiving respective ends of the battery.

5. The battery charger of claim 4 wherein the upper receptacle has a vent formed therein for venting gas from the battery.

6. The battery charger of claim 3 wherein the flashlight charging unit comprise a pair of jaws for holding the flashlight therein.

7. The battery charger of claim 1, wherein the compressive contact comprises a spring.

8. The battery charger of claim 7, wherein the compressive contact comprises a pair of springs for making respective negative and positive contacts with the rechargeable battery at the upper end thereof.

9. A battery charger, comprising:
 a body, having an upper contact portion, longitudinal rib portion, and a lower stop portion;
 the upper contact portion having an upper rim portion for holding an upper end of a battery therein contrary to a lateral force;
 the lower stop portion providing a mechanical stop at a lower end of the battery and having a lower rim portion for holding the lower end of a battery therein contrary to a lateral force; and
 the longitudinal rib portion joining the upper contact portion and the lower stop portion, whereby the rechargeable battery is compressively held between the upper contact portion and the lower stop portion.

10. The battery charger of claim 9, wherein the longitudinal rib portion has a groove formed therein for guiding the battery into a charging position between the upper contact portion and the lower stop portion.

11. The battery charger of claim 9, comprising a cap holder for holding a removable insulating cap for the battery.

12. The battery charger of claim 9, integrated with a flashlight charging unit for holding and charging a rechargeable flashlight.

13. The battery of claim 12, wherein the flashlight charging unit comprise a pair of jaws for holding the flashlight therein.

14. The battery charger of claim 9, comprising a compressive member positioned in one of the upper contact portion and the lower stop portion, for exerting a compressive force upon the battery.

15. The battery charger of claim 14, wherein the compressive member provides an electrical charging contact to the battery.

16. The battery charger of claim 15, wherein the compressive member comprises a pair of concentric springs for providing respective positive and negative contacts to one end of the battery.

17. A charging assembly, comprising:
 a flashlight charger having a body with holding means thereon for holding a rechargeable flashlight and for charging a rechargeable battery within the flashlight;
 an auxiliary battery charger for holding and charging an auxiliary battery, the auxiliary battery charger having a body with a laterally extending plate portion connected with the flashlight charger and forming a portion of the flashlight charger body, wherein the laterally extending plate portion of the auxiliary battery charger forms a back plate portion of the flashlight charger body.

* * * * *